(12) United States Patent
Rathi et al.

(10) Patent No.: US 6,930,985 B1
(45) Date of Patent: Aug. 16, 2005

(54) METHOD AND APPARATUS FOR MANAGEMENT OF CONFIGURATION IN A NETWORK

(75) Inventors: Manish Rathi, San Jose, CA (US); Tim Aiken, San Jose, CA (US)

(73) Assignee: Extreme Networks, Inc., Santa Clara, CA (US)

(*) Notice: Subject to any disclaimer, the term of this patent is extended or adjusted under 35 U.S.C. 154(b) by 968 days.

(21) Appl. No.: 09/699,248

(22) Filed: Oct. 26, 2000

(51) Int. Cl.$^7$ .............................................. H04L 12/28
(52) U.S. Cl. ...................... 370/254; 370/255; 709/223; 709/224
(58) Field of Search .............................. 370/241.1, 242, 370/244, 247, 250, 251, 252, 254, 255, 256, 370/351, 352, 353, 401, 402; 709/223, 224, 709/217, 219, 220, 225

(56) References Cited

U.S. PATENT DOCUMENTS

| | | | |
|---|---|---|---|
| 6,182,157 B1 * | 1/2001 | Schlener et al. | 719/318 |
| 6,363,421 B2 * | 3/2002 | Barker et al. | 709/223 |
| 6,404,743 B1 * | 6/2002 | Meandzija | 370/254 |

OTHER PUBLICATIONS

W. Stallings, SNMP, SNMPv2, SNMPv3, and RNON 1 and 2, Chapters 2-5, pp. 23-119, Sep. 1999, Addison Wesley Longman, Inc.

RFC1215, "Convention for defining traps for use with the SNMP," http://www.faqs.org/rfcs/rfc1215.html, pp. 1-7, Apr., 2000.

"Chapter 8: Configuring the Simple Network Management Protocol (SNMP)," http://osr5doc.sco.com:1996/cgi-bin/printchapter/NetAdminG/BOOKCHAPTER-8.html, pp. 1-38, Apr. 2000.

* cited by examiner

*Primary Examiner*—Phirin Sam
(74) *Attorney, Agent, or Firm*—Blakely, Sokoloff, Taylor & Zafman LLP

(57) ABSTRACT

A method for configuring and managing network elements comprising receiving a request at a network element to monitor at least one object on the network element; logging information by the network element in response to a change in value of the object; transmitting an indication from the network element of the change in value of the object; and receiving a request at the network element to read the information logged on the network element in response to the transmitted indication.

44 Claims, 3 Drawing Sheets

METHOD AND APPARATUS FOR MANAGEMENT OF CONFIGURATION IN A NETWORK

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention is related to network management. In particular, the present invention is related to a method and apparatus for management of configuration in a network.

2. Description of the Related Art

Network management stations perform network management functions including, but not limited to, fault detection, configuration of network elements, performance management, and security management. Typically, a network management station (NMS) invokes management software to communicate with agent software associated with network elements such as switches, routers, gateways, bridges, etc.

In the Internet, the protocol commonly used to communicate between a NMS and network elements is the Simple Network Management Protocol (SNMP). The set of specifications that define SNMP and associated databases may be found in Request For Comments (RFC) 1155, 1213, and 1157. SNMP defines both the syntax and semantics of the messages that a NMS and agents exchange.

In addition to the SNMP, separate standards for Management Information Bases (MIB) define the objects that SNMP maintain, the operations allowed, and the meaning of the specified operations. For example, the MIB for the Internet Protocol (IP) specifies that the SNMP agent must keep a count of all octets that arrive over each network interface of a router and that the network managing station can only read the count. MIB variables may specify network status parameters and track various aspects of the status of a network. By keeping MIBs independent of the SNMP, additions to MIBs can be defined without affecting the installed base of SNMP based network management stations, and the protocol can be used to communicate with network elements that have different versions of the same MIB.

In order to configure and manage network elements, the NMS uses a fetch-store paradigm. The SNMP get-request and set-request commands are the basic fetch and store operations respectively. The SNMP trap command enables a network element to communicate asynchronously with a NMS. The trap command is initiated by an SNMP agent associated with the network element, and provides the NMS with notification of some significant event as to the status of the network element. Specific traps may be user defined, and the SNMP agent may transmit an SNMP trap command when one or more user defined object values change. In SNMP trap-directed polling, information regarding a change in the network element is included in the trap packet sent to the NMS.

The use of traps to communicate information to the NMS is unreliable as traps can be lost due to the connectionless oriented nature of the SNMP. For management of configuration, lost traps are problematic because tracking network configuration requires that all changes in a network are reported to the NMS. Usually, network management stations regularly poll network elements in the network for the status and configuration of their managed objects. Based on the information regarding the managed objects obtained from the agent associated with the network element, the NMS may take some action. However, the polling mechanism used for configuring and monitoring networks is inefficient, especially if the NMS manages a large number of network elements. Periodic polling utilizes network capacity as polling is initiated by network management stations even when there may be no change in the objects that are being monitored. What is needed, therefore, is a more efficient method to configure and monitor network elements.

DETAILED DESCRIPTION OF THE INVENTION

Described is a method for management of configuration in a network. In particular, the invention describes a method for managing the configuration of network elements such as routers, gateways, bridges, etc. by one or more network management stations in an Internetwork. In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid unnecessarily obscuring the present invention. For example, specific details are not provided as to whether the method is implemented in a router, server or gateway, as a software routine, hardware circuit, firmware, or a combination thereof.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
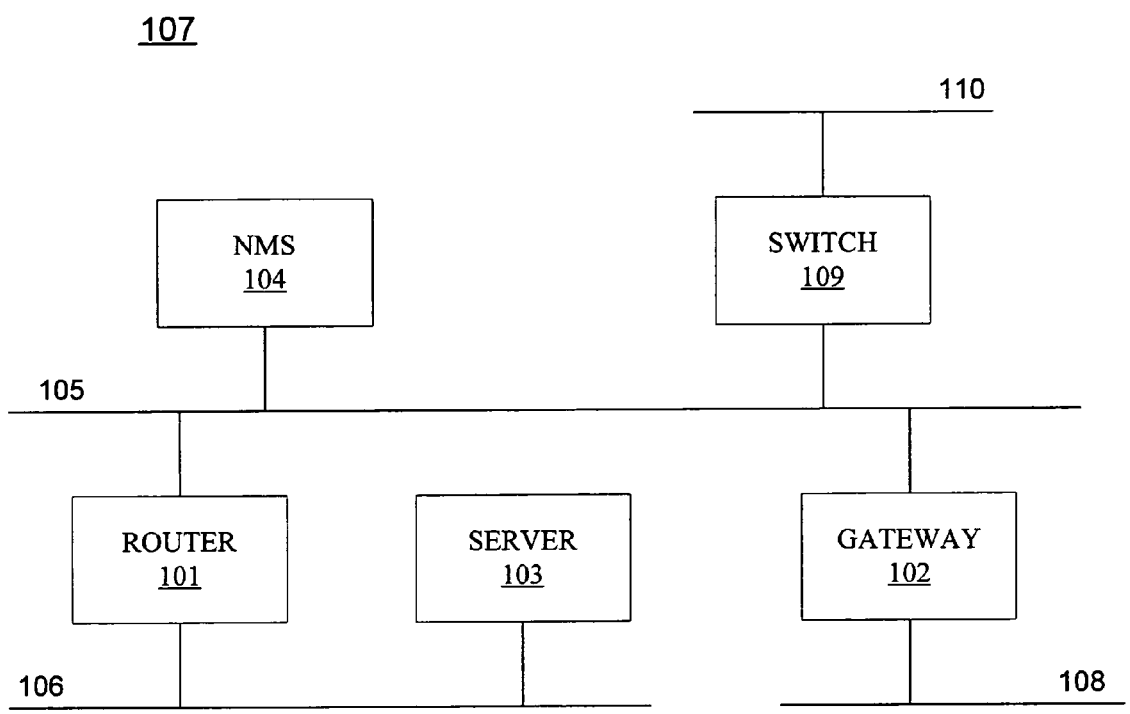
FIG. 1 illustrates an example of a network in which an embodiment of the present invention is utilized.

FIG. 1 illustrates a network 107 comprising a network management station (NMS) 104 connected to LAN 105 and managing network elements comprising router 101, gateway 102, server 103, and switch 109. In one embodiment, the NMS comprises a plurality of network management stations managing network configurations. Connecting the network elements are LANs 105, 106, 108 and 110. Each managed network element comprises agent software to communicate with the NMS. While the description that follows addresses the method as it applies to an internetwork architecture, it is appreciated by those of ordinary skill in the art that the method is generally applicable to any network architecture including, but not limited to, Local Area Networks (LANs), Metropolitan Area Networks (MANs), and Wide Area Networks (WANs).

As FIG. 1 illustrates, the network 107 comprises a NMS 104 which could be a dedicated computer with network management software that configures and monitors network elements such as router 101, gateway 102, and server 103. Each network element has agent software installed that enables it to communicate with a NMS and hence with a network administrator, and provides the network administrator with configuration and status information of the network element. In one embodiment, the communication protocol between NMS software and agents is SNMP. One skilled in the art will appreciate that other network management protocols may alternatively be used by the present invention.

One embodiment of the present invention uses MIB objects to monitor configuration parameters on network elements. In particular, the invention uses a trap-based method to monitor configuration parameters and changes thereto. Because the trap-based method is asynchronous, accessing the network element occurs only after a network element first sends the NMS a notification via a trap.

Figure 2:
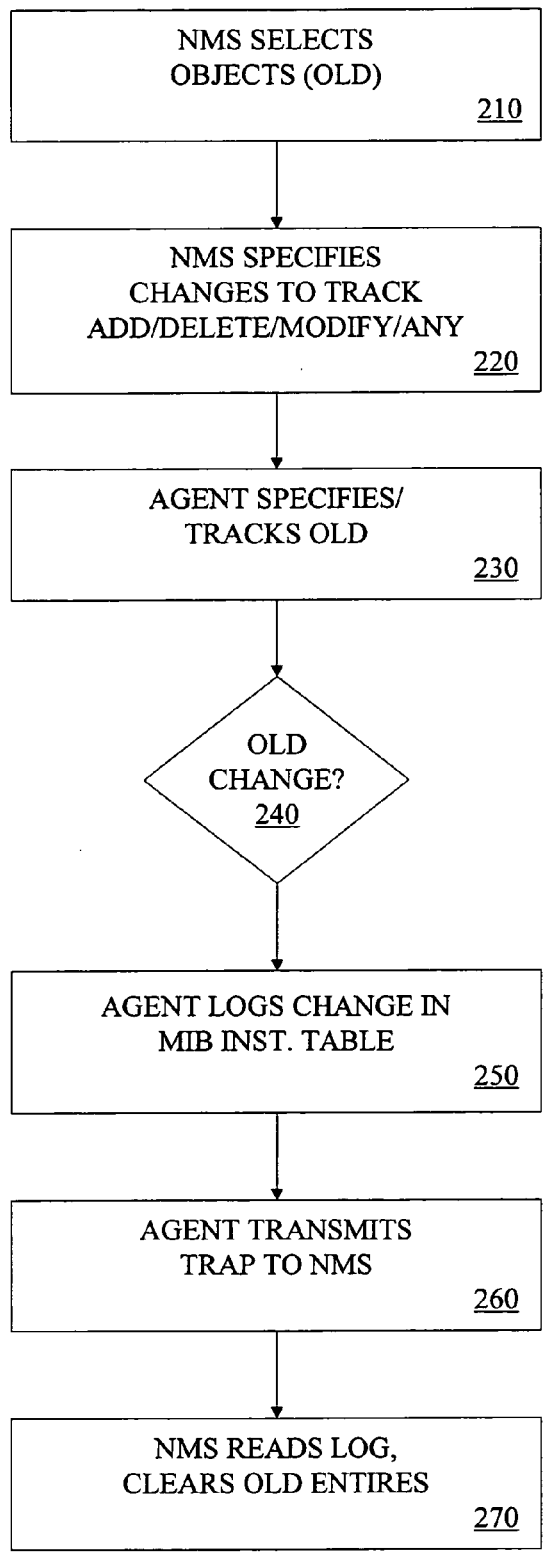
FIG. 2 is a flow diagram of an embodiment of the present invention.

With reference to FIG. 2, in one embodiment of the invention, at 210, the NMS first selects the configuration objects, whether represented by scalars (MIB leaf objects) or tables (MIB trees), it is interested in monitoring. This determination could be made either manually by a network administrator, or in accordance with a programmed algorithm. At 220, a request to monitor the selected MIB configuration objects is transmitted by the NMS to the agent software on a network element. Associated with each object in a MIB is an identifier called an object identifier (OID) that serves to uniquely identify the object. In one embodiment, the NMS writes to a MIB rules table associated with the network element identifying the OIDs it is interested in monitoring. In addition, the NMS transmits a rule to the network element specifying the conditions under which the network element is to send a trap to the NMS. Thus, each entry in the MIB rules table on a network element includes a rule that is used by the agent associated with the network element to generate a trap should there be an addition, deletion, modification, or any change in the configuration of the network element. In other words, if there is a change in the selected scalar, or in the value of any variable in a selected table, the agent associated with the network elements generates a trap.

In one embodiment, if the granularity of the selected MIB object is not supported by the agent, the agent sends a trap to the NMS with a less specific OID in the branch of the MIB tree. Thus, neither the agent nor the NMS have to keep track of each defined object on every network element. The trap is basically an indicator to the NMS notifying it that some change has occurred in a configuration object on the network element that the NMS is interested in monitoring. If more than one NMS is monitoring the configuration of the network element, in addition to transmitting the selected MIB objects and a rule specifying the condition for sending a trap, each NMS transmits information regarding its own identity in the form of a trap destination index. The agent associated with the network element uses the trap destination index to identify a particular NMS to which a trap is transmitted. As an example, Table 1 below illustrates the process by which network management software tracks the configuration of virtual local area networks (VLANs) on a LAN switch.

TABLE 1

| | | |
|---|---|---|
| 300 | Index = 5 | essentially the next available index in the rules table. |
| 305 | RowStatus = ACTIVE | |
| 310 | Desired OID = extremeVlanIfTable | A table indexed by Interface number that stores a list of VLANs. |
| 315 | Operation = ANY | |
| 320 | TrapDestinationIndex = 2 | This is the index of the net mgmt software host in the trap-receivers table. |
| 325 | SupportedOID = extremeVlanIfTable | The Agent software sets the value of SupportedOID, as either the value that was asked for, or to a less specific OID supported by the agent software. |

Note:
This rule means that if any operation is performed which causes a Vlan configuration, represented by extremeVlanIFTable to be added, deleted or modified, then a smarttrap instance is recorded, and the SNMP manager is notified.

In Table 1 at 300, an entry is made in a MIB rules table located on the LAN switch, here called the extremeSmartTrapsRulesTable. At 305, the tracking for the defined OID is set to Active state. This means that the agent software on the switch starts tracking the defined object identifier (OID). At 310, the NMS specifies that the desired OID it is interested in monitoring is the extremeVlanIf Table. The OID is defined as follows: enterprises.extremenetworks.extremeagent.extremevlan.extremeviangroup.extremevlaniftable. At 315, the NMS specifies that for any change in the OID the agent on the LAN switch is to notify the NMS by sending a trap. Thus, for example, if a VLAN is added, modified or deleted, the agent is to notify the NMS by sending a trap. At 320, the agent software is to send the trap to TrapDestinationindex=2. This is the index of a NMS in the trap-receivers table. In this example multiple network management stations are monitoring the configuration of the network. Hence, the trap is to be sent to the second NMS. At 325, the agent sets the value of the SupportedOID as the OID value specified by the NMS. In one embodiment, if the selected OID is not supported by the agent, the agent sets the SupportedOID parameter to a less specific OID that it does support, i.e., one that is defined by the previous node in a branch of the MIB tree. In the example above, if the NMS selects the extremevlaniftable OID for the agent to monitor, but the agent software only supports the extremevlangroup OID, then a trap is sent whenever the agent software detects a change in the more specific than the supported OID, i.e., when there is a change in any OID that is contained in the extremevlangroup.

Returning to FIG. 2, at 230, once the agent has received an indication of the selected MIB objects the NMS is interested in monitoring, the agent monitors the objects for any changes in accordance with the specified rules. If no change is detected at 240, the agent continues to track the OIDs. However, if a change is detected at 250, the change is logged to a MIB instance table on the network element.

Table 2 below illustrates a MIB instance table on a network element.

TABLE 2

| | | |
|---|---|---|
| 400 | Index = TrapDestinationIndex | obtained from the RulesTable. This identifies the manager for whom data was obtained. |

TABLE 2-continued

| | | |
|---|---|---|
| 405 | RuleNumber = 5 | which rule is this log corresponding to. |
| 410 | ChangedOID = extremeVlanIfTable.67 | if the operation was performed on the vlan represented by the 67th index. |
| 415 | Operation = DELETE | if operation was delete. |
| 420 | ChangeTime = 9567423 | the SysUpTime when this action happened. |

The entries in the MIB instance table include at 400, an entry identifying each network management station that requested the monitoring of the particular configuration object, at 405 an entry identifying the index of the rule in the MIB rules table in accordance with which the entry was created, at 410 an entry identifying the OID value that has changed, at 415 an entry identifying the operation performed that caused the generation of the trap, and at 420 an entry identifying the time when the entry was created.

Returning to FIG. 2 at 260, after logging the changes in the MIB instance table, the agent associated with the network element sends a trap to the NMS that initiated the writing of the selected MIB objects in the MIB rules table. The NMS, on receipt of the trap, at 270, may contact the agent that sent the trap and read the MIB instance table. At this time, the NMS may, in one embodiment of the invention, clear the MIB instance table. By having the NMS read the MIB instance table after receipt of the trap, rather than have the information sent to the NMS as part of the trap packet, as is done in SNMP-based trap polling, the embodiment of the present invention ensures that configuration information is not lost due to dropped packets. Moreover, by having the NMS read the MIB instance table after receipt of a trap, rather than periodically polling the network elements, increased network bandwidth is made available for other applications. In another embodiment of the invention, if the NMS has not received a trap within some predetermined time interval, it is possible for the NMS to read the MIB instance table on its own initiative to examine the configuration of network elements. In one embodiment, polling of all the data tables is not necessary as merely reading the MIB instance table is sufficient. This is done infrequently as compared with the frequency of periodically polling the agents. Hence, despite this poll a substantial savings in bandwidth and processor utilization is achieved.

Figure 3:
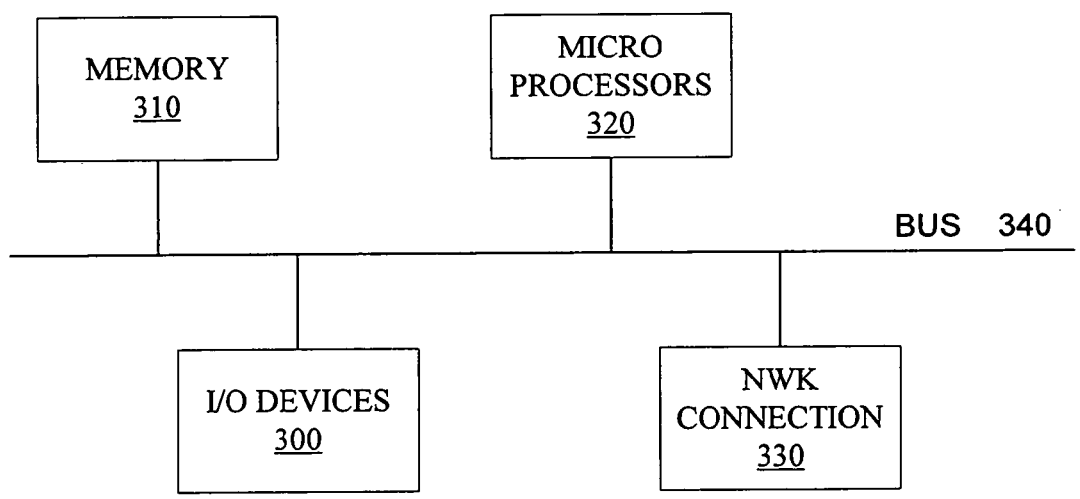
FIG. 3 illustrates an apparatus comprising an embodiment of the invention.

FIG. 3, illustrates an apparatus that contains an embodiment of the invention on which the agent software is installed. The apparatus comprises I/O devices 300 that include a network transceiver, to receive a request to monitor at least one configuration object and to receive a request to read a log containing entries with regard to additions, deletions, modifications, or any changes to selected configuration objects. Communicatively coupled to the transceiver are one or more microprocessors 320 and memory 310. The agent software executed by the microprocessor monitors changes to the selected configuration objects, logs any changes to a file stored in the memory, and transmits a trap to a NMS. The memory stores a MIB rules table that contains the selected configuration objects along with the parameters or rules needed to generate a trap. The transceiver transmits, via network connection 330, a trap that is an indication to the NMS that a change in value of the selected configuration object has occurred.

In another embodiment, FIG. 3 illustrates an apparatus that comprises a transceiver to receive a trap, that is, an indication from a network element of a change in a selected configuration object. Communicatively coupled to the transceiver are one or more microprocessors 320 and memory 310. The management software executed by the microprocessor analyzes the trap or indication received from the network element and manages the configuration of the network element accordingly. The transceiver transmits a request to monitor at least one configuration object on a network element, and to read the log containing the configuration changes on the network element.

Thus, a method has been disclosed for management of configuration in a network environment. Embodiments of the invention may be represented as a software product stored on a machine-readable medium (also referred to as a computer-readable medium or a processor-readable medium). The machine-readable medium may be any type of magnetic, optical, or electrical storage medium including a diskette, CD-ROM, memory device (volatile or non-volatile), or similar storage mechanism. The machine-readable medium may contain various sets of instructions, code sequences, configuration information, or other data. For example, the procedures described herein for polling network elements by network management stations can be stored on the machine-readable medium. Those of ordinary skill in the art will appreciate that other instructions and operations necessary to implement the described invention may also be stored on the machine-readable medium.

What is claimed is:

1. A method comprising:
   transmitting a request from a first network element to a second network element to monitor at least one object on the second network element;
   receiving the request at the second network element;
   logging information about the at least one object by the second network element in response to a change in value of the object;
   transmitting an indication from the second network element to the first network element of the change in value of the at least one object; and
   reading by the first element of the information logged on the second network element in response to the transmitted indication.

2. The method of claim 1, wherein receiving the request at the second network element to monitor the at least one object on the network element comprises establishing a rule in a management information base rules table on the second network element to monitor a configuration object on the second network element.

3. The method of claim 2, wherein monitoring the configuration object comprises logging a change in value of the configuration object as specified by the request.

4. The method of claim 2, wherein monitoring the configuration object comprises specifying the configuration object's object identifier in the management information base tree.

5. The method of claim 4, wherein specifying the configuration object's object identifier comprises using a less specific object identifier in the management information base tree, if monitoring the configuration object is not supported in the management information base tree.

6. The method of claim 1, wherein logging information by the second network element in response to a change in value of the object comprises logging information about the change in the second network element's configuration in a management information base instance table.

7. The method of claim 1, wherein the first network element comprises a network management station.

8. The method of claim 7, wherein transmitting an indication from the second network element of the change in value of the object comprises transmitting a SNMP (Simple Network Management Protocol) trap to the network management station whenever a change in value of the object is detected by the second network element.

9. The method of claim 1, wherein transmitting a request to the second network element to monitor the at least one object on the second network element comprises the first network element writing a rule to a management information base rules table on the second network element to monitor a configuration object of the second network element.

10. The method of claim 9, wherein writing a rule to the management information base rules table on the second network element to monitor the configuration object further comprises writing a rule to monitor at least one of an addition, deletion, modification or a change in value of the configuration object by the second network element.

11. The method of claim 9, herein writing a rule to the management information base rules table on the second network element to monitor the configuration object further comprises specifying the configuration object's object identifier in a management information base tree.

12. The method of claim 1, wherein reading the information logged on the second network element in response to the indication received comprises the first network element reading the information logged in a management information base instance table on the second network element.

13. An article of manufacture comprising a machine-readable medium that provides instructions, that when executed by a machine, cause the machine to perform operations comprising:
  transmitting a request from a first network element to a second network element to monitor at least one object on the second network element;
  receiving the request at the second network element;
  logging information about the at least one object by the second network element in response to a change in value of the object;
  transmitting an indication from the second network element to the first network element of the change in value of the at least one object; and
  reading by the first element of the information logged on the second network element in response to the transmitted indication.

14. The medium of claim 13, wherein receiving the request at the second network element to monitor the at least one object on the network element comprises establishing a rule in a management information base rules table on the second network element to monitor a configuration object on the second network element.

15. The medium of claim 14, wherein monitoring the configuration object comprises logging a change in value of the configuration object as specified by the request.

16. The medium of claim 14, wherein monitoring the configuration object comprises specifying the configuration object's object identifier in the management information base tree.

17. The medium of claim 16, wherein specifying the configuration object's object identifier comprises using a less specific object identifier in the management information base tree, if monitoring the configuration object is not supported in the management information base tree.

18. The medium of claim 13, wherein logging information by the second network element in response to a change in value of the object comprises logging information about the change in the second network element's configuration in a management information base instance table.

19. The medium of claim 13, wherein the first network element comprises a network management station.

20. The medium of claim 19, wherein transmitting an indication from the second network element of the change in value of the object comprises transmitting a SNMP (Simple Network Management Protocol) trap to the network management station whenever a change in value of the object is detected by the second network element.

21. The medium of claim 13, wherein transmitting a request to the second network element to monitor the at least one object on the second network element comprises the first network element writing a rule to a management information base rules table on the second network element to monitor a configuration object of the second network element.

22. The medium of claim 21, wherein writing a rule to the management information base rules table on the second network element to monitor the configuration object further comprises writing a rule to monitor at least one of an addition, deletion, modification or a change in value of the configuration object by the second network element.

23. The medium of claim 21, wherein writing a rule to the management information base rules table on the second network element to monitor the configuration object further comprises specifying the configuration object's object identifier in a management information base tree.

24. The medium of claim 13, wherein reading the information logged on the second network element in response to the indication received comprises the first network element reading the information logged in a management information base instance table on the second network element.

25. An apparatus comprising:
  a transceiver to transmit a request to a network element to monitor at least one configuration object on the network element, and to read information logged in a management information base instance table on the network element; and
  a microprocessor communicatively coupled to the transceiver, and a memory to execute a program to analyze information received from the network element and to manage the configuration of the network element based on the information analyzed;
  the transceiver to receive an indication from the network element in response to a change in the value of the configuration object, the transceiver to read the information logged in the management information base instance table on the network element in response to the indication of change in the value of the configuration object.

26. The apparatus of claim 25, wherein the indication received by the receiver is a SNMP trap.

27. The apparatus of claim 25, wherein the network element maintains a management information base rules table containing the object identifiers of the configuration objects to be monitored.

28. A method comprising:
  receiving a request at a network element to monitor at least one object on the network element;
  logging information about the at least one object by the network element in response to a change in value of the object;
  transmitting an indication from the network element of the change in value of the at least one object; and receiving a request at the network element to read the information about the at least one object logged on the network element in response to the transmitted indication;

wherein receiving a request at a network element to monitor at least one object on the network element comprises establishing a rule in a management information base rules table on the network element to monitor a configuration object on the network element, and wherein monitoring a configuration object comprises specifying the configuration object's object identifier in the management information base tree, and wherein specifying the configuration object's object identifier comprises using a less specific object identifier in the management information base tree, if monitoring the configuration object is not supported in the management information base tree.

29. The method of claim 28, wherein logging information by the network element in response to a change in value of the object comprises logging information about the change in the network element's configuration in a management information base instance table.

30. The method of claim 28 wherein receiving a request at a network element to monitor at least one object on the network element comprises receiving a request from one or more network management stations to monitor at least one object on the network element.

31. The method of claim 28, wherein transmitting an indication from the network element of the change in value of the object comprises transmitting a SNMP trap to a network management station whenever a change in value of the object is detected by the network element.

32. The method of claim 28, wherein receiving a request at the network element to read the information logged on the network element in response to the transmitted indication comprises a network management station reading the logged data from a management information base instance table on the network element.

33. A method comprising:
transmitting a request to a network element to monitor at least one object on the network element;
receiving an indication from the network element in response to a change in the value of the object being monitored; and
reading information logged on the network element in response to the indication received;
wherein transmitting a request to the network element to monitor at least one object on the network element comprises writing a rule to a management information base rules table on the network element to monitor a configuration object of the network element, and wherein writing a rule to a management information base rules table on the network element to monitor a configuration object further comprises writing a rule to monitor at least one of an addition, deletion, modification or a change in value of the configuration object by the network element.

34. The method of claim 33, wherein writing a rule to a management information base rules table on the network element to monitor a configuration object further comprises specifying the configuration object's object identifier in the management information base tree.

35. The method of claim 33, wherein receiving an indication from the network element in response to a change in the value of the object being monitored comprises receiving a SNMP trap from the network element.

36. The method of claim 33, wherein reading information logged on the network element in response to the indication received comprises reading the information logged in a management information base instance table on the network element.

37. An article of manufacture comprising a machine-readable medium that provides instructions, that when executed by a machine, cause said machine to perform operations comprising:
receiving a request at a network element to monitor at least one object on the network element;
logging information about the at least one object by the network element in response to a change in value of the object;
transmitting an indication from the network element of the change in value of the at least one object; and
receiving a request at the network element to read the information about the at least one object logged on the network element in response to the transmitted indication;
wherein receiving a request at the network element to monitor at least one object on the network element includes establishing a rule in a management information base rules table on the network element to monitor a configuration object of the network element, and wherein monitoring a configuration object on the network element includes specifying the configuration object's object identifier in the management information base tree.

38. The medium of claim 37, wherein said instructions for specifying the configuration object's object identifier includes further instructions to direct said machine to specify a previous object identifier in the management information base tree if the specified configuration object's object identifier is not defined in the management information base.

39. The machine-readable medium of claim 37, wherein said instructions for transmitting an indication from the network element of the change in value of the object includes further instructions to direct said machine to transmit a SNMP trap to a network management station whenever a change in value of the object is detected by the network element.

40. The machine-readable medium of claim 37, wherein said instructions for receiving a request at the network element to read the information logged on the network element in response to the transmitted indication includes further instructions for a network management station reading the logged data from a management information base instance table on the network element.

41. An article of manufacture comprising a machine-readable medium that provides instructions, that when executed by a machine, cause said machine to perform operations comprising:
transmitting a request to a network element to monitor at least one object on the network element;
receiving an indication from the network element in response to a change in the value of the object being monitored; and
reading information logged, on the network element in response to the indication received;
wherein transmitting a request to the network element to monitor at least one object on the network element includes writing a rule to a management information base rules table on the network element to monitor a configuration object of the network element, wherein writing a rule to a management information base rules table on the network element to monitor a configuration object includes writing a rule to monitor at least one of an addition, deletion, modification or a change in value of the configuration object by the network element.

42. The medium of claim 41, wherein receiving an indication from the network element in response to a change in the value of the object being monitored includes further instructions to read the information logged in a management information base instance table on the network element.

43. An article of manufacture comprising a machine-readable medium that provides instructions, that when executed by a machine, cause said machine to perform operations comprising:

transmitting a request to a network element to monitor at least one object on the network element;

receiving an indication from the network element in response to a change in the value of the object being monitored; and reading information logged on the network element in response to the indication received;

wherein transmitting a request to the network element to monitor at least one object on the network element includes writing a rule to a management information base rules table on the network element to monitor a configuration object of the network element, and wherein writing a rule to a management information base rules table on the network element to monitor a configuration object includes specifying the configuration object's object identifier in the management information base tree.

44. The medium of claim 43, wherein receiving an indication from the network element in response to a change in the value of the object being monitored includes further instructions to read the information logged in a management information base instance table on the network element.

* * * * *